United States Patent [19]

Loktaeva et al.

[11] 3,947,147

[45] Mar. 30, 1976

[54] STATOR OF HYDRAULIC MACHINE WITH THE END-FACE SEALING OF VANES

[76] Inventors: Valentina Vasilievna Loktaeva, prospekt Prosveschenia, 104, kv. 344; Vitaly Viktorovich Vikhirev, Svetlanovsky prospekt, 101, kv. 278; Gleb Stepanovich Schegolev, ulitsa Sinyavinskaya, 12/49, kv. 29, all of Leningrad, U.S.S.R.

[22] Filed: Sept. 27, 1974

[21] Appl. No.: 510,133

[30] Foreign Application Priority Data

Apr. 8, 1974 U.S.S.R. .......................... 2009028

[52] U.S. Cl. .............. 415/113; 415/163; 415/170 A
[51] Int. Cl.² ................... F01D 17/14; F01D 11/00
[58] Field of Search ....... 415/110, 113, 170 A, 163; 277/237 MD

[56] References Cited
UNITED STATES PATENTS

| | | | |
|---|---|---|---|
| 2,873,683 | 2/1959 | Sherwood | 415/113 |
| 2,875,979 | 3/1959 | Danel et al. | 415/163 |
| 3,284,086 | 11/1966 | Primrose et al. | 277/237 MD |
| 3,332,441 | 7/1967 | Schaale | 415/113 |
| 3,743,435 | 7/1973 | Sproule et al. | 415/163 |

FOREIGN PATENTS OR APPLICATIONS

| | | | |
|---|---|---|---|
| 1,257,377 | 2/1961 | France | 415/163 |
| 1,175,271 | 11/1958 | France | 415/113 |

*Primary Examiner*—Henry F. Raduazo
*Attorney, Agent, or Firm*—Steinberg & Blake

[57] ABSTRACT

A stator of a hydraulic machine with the end-face sealing of vanes comprises an upper rim, a lower rim and rotatable stator vanes mounted with their journals in said rims in such a manner as to form an annular row. The upper and lower rims are provided with holes for receiving the vane journals and with rectangular recesses located between the adjacent holes receiving the vane journals in the zone of projection of the section of the vanes on said rims when the vanes are in the closed position. In order to eliminate leakages of liquid between the rims and the end faces of the vanes, a seal is disposed in each recess along the entire length thereof. The seal comprises a gasket inserted in the recess with a space remaining between the base thereof and the bottom of the recess, the gasket having at least one through passage for filling the space with liquid flowing to the stator. The passage has the cross-sectional area sufficient to build-up a pressure beneath the gasket for urging it against the end faces of the vanes. In order to prevent leakages through the space, a sealing member is mounted between the gasket and the rim.

6 Claims, 4 Drawing Figures

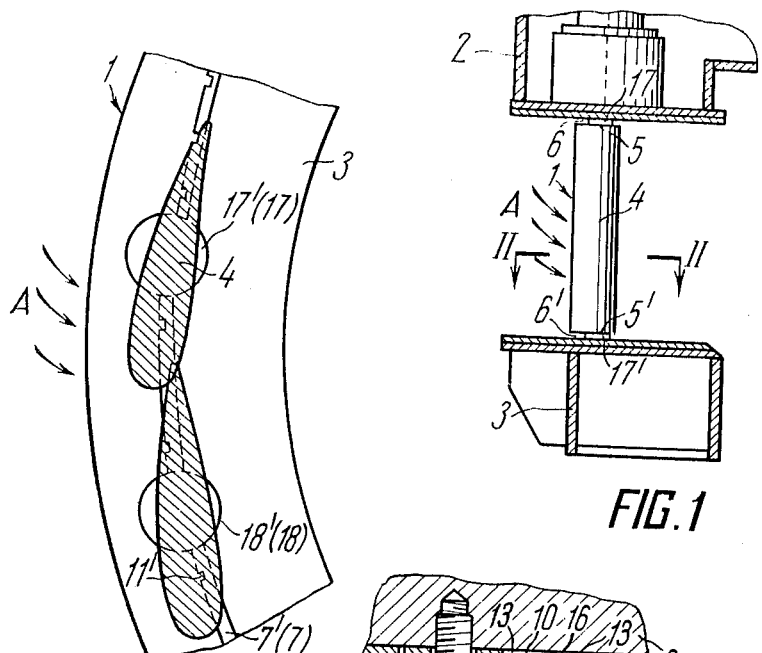
FIG. 1
FIG. 2
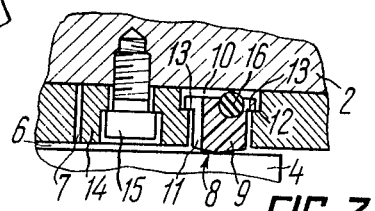
FIG. 3
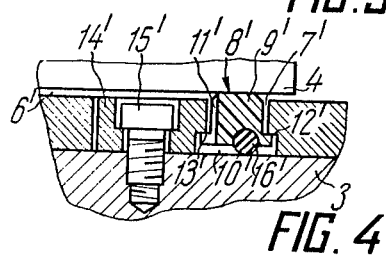
FIG. 4

STATOR OF HYDRAULIC MACHINE WITH THE END-FACE SEALING OF VANES

The present invention related to the manifacturing of hydraulic machines, and more particularly to stators of hydraulic machines having the end-face sealing of vanes.

The invention can be the most advantageously used in hydraulic machines operating preferably under high heads.

Generally, in hydraulic turbines and pumps use is made of a stator comprising an upper rim and a lower rim, as well as stator vanes rotatably mounted therebetween. The stator vanes are arranged to form an annular row and serve to control the discharge of liquid flowing to the runner of the hydraulic machine. Small spaces are defined between the end faces of each vane and the rims. When the stator is in the closed position, the vanes contact each other, the inlet edge of each vane being in contact with the outlet edge of another vane so that liquid cannot penetrate the chamber of the runner. However, some amount of liquid leaks from the zone before the stator through the spaces at the end faces of the vanes into the chamber of the runner. In order to eliminate the leakage of liquid between the end faces of the stator vanes and the upper and lower rims, a seal is used.

Known in the art is a stator of a hydraulic machine with the end-face sealing of vanes.

In this hydraulic machine, a stator comprises an upper rim and a lower rim, as well as rotatable stator vanes mounted in the rims in such a manner as to form an annular row. Small spaces are formed between the end faces of each vane and the rims. The upper and lower rims are provided with holes for receiving journals of the rotatable vanes, as well as with recesses. The recesses are disposed between the adjacent holes receiving the journals of the vanes in the zone of projection of the section of each vane on the rims when the vanes are in the closed position. In order to eliminate the leakage of liquid from the zone before the stator into the chamber of the runner through the spaces between the end faces of the vanes and the rims, a seal is provided in the recesses along the entire length thereof. This known seal comprises a metallic gasket with an elastic member mounted on a housing. The housing is provided with a thread to engage the journals of the adjacent vanes. The housing is mounted in the recess, and an elastic cord having e.g. a U-shaped configuration is placed on the bottom of the recess.

When the vanes of the stator are rotated to close the latter the housing is caused to move towards the end faces of the adjacent vanes due to the threaded connection between the housing and the journals of the vanes. Thus, the gasket is positively urged against the end faces of the vanes with the vanes in the completely closed position.

However, this construction of the seal cannot provide for reliable engagement between the metallic gasket and the end faces of the vanes due to the fact that the long plates of the housing are fastened only at the end faces of the vanes which results in sagging of the plates in the central portion thereof. As the pressure grows, the leakage of liquid in the central portion of the plates increases, thus resulting in an increased sagging of the plate. This renders such seals unsuitable for hydraulic machines operating under a high head. Another disadvantage of such prior art seal resides in the fact that it is complicated in manufacture and maintenance.

Known in the art is a better construction of a stator with the end-face sealing of vanes.

This prior art stator of a hydraulic machine comprises an upper rim, a lower rim and rotatable stator vanes located in the upper and lower rims in such a manner as to form an annular row. Each stator vane is arranged so that its end faces are adjacent to the rims.

The upper and lower rims are provided with holes for receiving journals of the stator vanes, as well as with arcuated recesses. The recesses are arranged between the adjacent holes receiving the journals of the vanes in the zone of projection of the section of each vane on the rims when the vanes are in the closed position. When in the closed position, the vanes engage each other so that the inlet edge of each vane engages the outlet edge of the adjacent vane, whereby liquid cannot flow from the zone before the stator into the chamber of the runner. However, small spaces are formed between the end faces of each vane and the upper and lower rims so that liquid leaks through these spaces into the chamber of the runner. In order to eliminate the leakage of liquid through these spaces, a seal is provided in the recesses along the entire length thereof, which is essentially a composite seal consisting of a metallic portion and an elastic portion. The elastic portion of the seal comprising an elastic gasket is located between the metallic portion of the seal, (metallic gasket) and the bottom of the recess and serves for urging the metallic gasket against the end faces of the vanes. When the stator is in the closed position, the metallic gaskets protrude from the recesses of the upper and lower rims under the action of elastic gaskets and are urged against the end faces of the vanes. This results in sealing of the space between the end faces of the vanes and the upper and lower rims.

This prior art sealing means cannot, however, ensure a reliable sealing between the end faces of the vanes and the upper and lower rims under high heads because the urging force which can be developed by the elastic gasket is limited by the elastic properties of the material. Under high heads, the elastic properties of the gaskets can ensure the development of the pressure force which is smaller than that developed by the working liquid under the head of a water power plant. In addition, it is known that with a time lapse elastic properties of the material of elastic gaskets (generally, various kinds of rubber) are deteriorated so that the sealing efficiency decreases.

It is an object of the invention to improve the reliability of the end-face sealing of the stator vanes upon closing of the stator under largely variable heads.

Another object of the invention is to prolong the service life of the stator by improving the wear resistance of the gaskets.

In accordance with these and other objects, the invention consists in the provision of a stator of a hydraulic machine comprising: an upper rim; a lower rim; rotatable stator vanes; holes provided in said rims for receiving journals of said vanes said rotatable guide vanes being mounted in said upper and lower rims in such a manner as to form an annular row, and each of said vanes having the end faces thereof arranged adjacent to said upper and lower rims; rectangular recesses in said upper and lower rims, each recess being arranged in the zone of projection of the section of said vanes on said rims when said vanes are in the closed position, said rectangular recesses being disposed between said adjacent holes receiving the journals of said vanes; a seal for preventing leakages of liquid between said rims and said end faces of said vanes; said seal being disposed in each of said recesses of said upper and lower rims, extending along the entire length thereof and comprising a gasket positioned in such a manner as to form a space between the base thereof and the bottom of said recess and having at least one through passage for filling said space with liquid flowing to the stator of the hydraulic machine, said passage having the cross-sectional area sufficient to build-up a pressure beneath said gasket for urging it against the end faces of said vanes; a sealing member for preventing leakages through said space, said sealing member being mounted between said gasket and said rim.

In this stator, a reliable sealing between the end faces of the vanes and the upper and lower rims is ensured upon closing the vanes under largely variable heads. The space between the base of the sealing gasket and the bottom of the recess is filled with liquid under pressure equal to the effective head. This pressure ensures that urging of the gaskets against the end faces of the vanes upon closing them, the urging force being proportional to the value of head, that is, the greater the head, the stronger the urging force pressing the gasket against the end faces of the vanes. This results in a considerable reduction of leakages from the zone before the stator into the chamber of the runner.

Each gasket is preferably made of a wear-resistant material.

It is expedient that each gasket be made of polyethylene.

The gasket made of polyethylene exhibits sufficient wear- and cavitation resistance so that the service life of the stator is prolonged.

Where gaskets of other materials having lower wear resistance are used, the following phenomenon occurs. During the operation of the hydraulic machine the greatest wear takes place in the zones of gaskets located closer to the vane journals, while the intermediate portion of the gasket remains intact. The moment the stator is closed, the gasket is retracted into the recess at the distance corresponding to the amount of wear so that gaps remain along the worn portions through which water leaks to disturb the sealing between the rims and the end faces of the vanes. The leakages occuring through the gaps at high velocities result in a cavitation which damages the gaskets and rims thus substantially reducing the service life of the seal and the stator as a whole.

The employment of polyethylene as a material for the gasket, rather than tin-containing alloys, such as brass, reduces the cost of the seal and the stator as a whole.

Other objects and advantages of the invention will become apparent from the following description of a specific embodiment thereof with reference to the accompanying drawings, in which:

FIG. 1 shows a diagrammatic radial section of a portion of a stator;

FIG. 2 is a sectional view taken along the line II—II of FIG. 1;

FIG. 3 shows an enlarged view of a seal positioned between the end face of a vane and the upper rim;

FIG. 4 shows an enlarged view of a seal positioned between the end face of a vane and the lower rim.

FIG. 1 shows a portion of a stator 1 of a Francis water turbine with the end-face sealing of vanes according to the invention comprising opposed rims such as an upper rim 2 and a lower rim 3. Rotable stator vanes 4 are mounted with their journals in the upper rim 2 and the lower rim 3 in such a manner as to form an annular row, the vanes serving to control the discharge of the working liquid flowing to the runner (not shown) of the water turbine. Each guide vane 4 has its end faces 5 and 5' located adjacent to said rims 2 and 3.

A small space 6 is provided between the end face 5 of each vane 4 and the upper rim 2, and a small space 6' is provided between the end face 5' of each vane 4 and the lower rim 3. The spaces 6 and 6' are selected to have a minimal size to prevent the vanes 4 from interfering with the rims 2 and 3 upon rotation. The upper rim 2 and the lower rim 3 are provided with holes for receiving journals 17 and 17' of the stator vanes 4 and rectangular recesses 7 (FIG. 3) and 7' (FIGS. 2 and 4). Since all elements of the upper rim 2 (FIG. 1) are similar to the elements of the lower rim 3, only the lower rim 3 is shown in FIG. 2 for the sake of clarity. The rectangular recesses 7' (7) are located between the adjacent holes 18' (18) receiving the journals 17' (17) of the vanes 4 in the zone of projection of the section of each vane 4 on the rim 3 as shown in FIG. 2, when the vanes 4 are in the closed position, while in the closed position, the vanes 4 engage each other so that the inlet edge of each vane 4 is in contact with the outlet edge of the adjacent vane 4 to hamper the flow of liquid from the zone A before the stator 1 into the chamber of the runner (not shown). However, liquid can leak through the spaces 6 and 6' (FIG. 1) into the chamber of the runner. In order to eliminate the leakage of liquid through said space 6, a seal 8 is palced in the recesses 7 (FIG. 3) of the upper rim 2 along the entire length of each recess. In order to eliminate the leakage of liquid through the space 6' (FIG. 4), a seal 8' is placed in the recesses 7' of the lower rim 3 along the entire length of each recess.

Each seal 8 (FIG. 3) comprises a rectangular gasket 9 of a wear-resistant material, e.g. of polyethylene. The gaskets 9 may have an appropriate shape ensuring their close contact with the end faces 5 of the guide vanes 4 and are mounted to form a space 10 between the base of the gasket and the bottom of the recess 7. The polyethylene gasket 9 has at least one through passage 11 so that the liquid from the zone A (FIG. 1) before the stator 1 flows through the passage into the space 10 (FIG. 3). The cross-sectional area of the passage should be sufficient to buildup a pressure beneath the gasket 9 urging it against the end faces 5 of the vanes 4, this area being determined by any known method.

Each seal 8' (FIG. 4) comprises a gasket 9' of a wear-resistant material, e.g. of polyethylene. The gaskets 9' may have any appropriate shape ensuring their close contact with the end faces 5' of the vanes 4 and are mounted to form a space 10' between the gasket base and the bottom of the recess 7'. The body of the polyethylene gasket 9' is provided with e.g. three through passages 11' (FIG. 2) so that the liquid from the zone A before the stator 1 flows into the space 10' (FIG. 4). The total cross-sectional area of the passages 11' is sufficient to build-up a pressure beneath the gasket 9' urging it against the end faces 5' of the vanes 4.

Any appropriate means may be used for holding the gaskets 9 (FIG. 3) and 9' (FIG. 4) in the recesses 7 (FIG. 3) and 7' (FIG. 4). For the purpose of illustration only, it is shown in the drawings that the recesses 7

(FIG. 3) are provided with a shoulder 12, and the recesses 7' (FIG. 4) are provided with a shoulder 12'. The gasket 9 (FIG. 3) has two flanges 13. One flange 13 rests against the shoulder 12 of the recess 7, while the other flange 13 rests against a shoulder of a bar 14 fixed by means of bolts 15 to the upper rim 2. The gasket 9' (FIG. 4) is provided with two flanges 13. One flange 13' rests against the shoulder 12' of the recess 7', while the other flange 13' rests against a shoulder of a bar 14' fixed to he lower rim 3 by means of bolts 15'.

The polyethylene gaskets 9 (FIG. 3) and 9' (FIG. 4) are mounted in such a manner that they protrude beyond the planes of the rims 2 (FIG. 3) and 3 (FIG. 4) so as to take part in the closing of the stator 1 (FIG. 1). In order to eliminate leakages of liquid through the space 10 (FIG. 3)) from the high pressure zone A (FIG. 1) before the stator 1 into the chamber of the runner, a sealing member 16 is provided between the gasket 9 and the upper rim 2 (FIG. 3), and to prevent liquid from leaking through the space 10' (FIG. 4) between the gasket 9' and the lower rim 3, there is provided a sealing member 16'. The sealing member 16 (FIG. 3) and 16' (FIG. 4) may be located at any point on the path of flow of liquid through the space 10 (FIG. 3) and 10' (FIG. 4). As shown in the drawings, (in the cross section), the sealing member 16 (FIG. 3) and 16' (FIG. 4) comprises a solid round cord made of rubber.

Upon closing the stator 1 (FIG. 1). the end faces 5 (FIG. 3) and 5' (FIG. 4) of the vanes 4 engage the protruding portions of the rectangular polyethylene gaskets 9 (FIG. 3) and 9' (FIG. 4) to displace them into the recesses 7 (FIG. 3) and 7' (FIG. 4) of the rims 2 (FIG. 3) and 3 (FIG. 4) respectively.

The liquid from the pressure zone A (FIG. 1) before the stator 1 flows through the passages 11 (FIG. 3) and 11' (FIG. 4) in the body of the polyethylene gaskets 9 (FIG. 3) and 9' (FIG. 4) into the space 10 (FIG. 3) and 10' (FIG. 4) to act on the base of the gaskets 9 (FIG. 3) and 9' (FIG. 4), thereby providing their efficient urging against the end faces 5 (FIG. 3) and 5' (FIG. 4) of the vanes 4. The greater the head of water in the zone A (FIG. 1) before the stator 1, the stronger the urging of the gaskets 9 (FIG. 3) and 9' (FIG. 4) against the end faces 5 and 5' of the vanes 4 under the action of water so that a reliable barrier for liquid is provided between the end faces 5 and 5' of the vanes 4 and the rims 2 and 3.

What is claimed is:

1. In a stator of a hydraulic machine, a pair of opposed rims spaced from each other and respectively situated in parallel planes, a plurality of rotatable stator vanes each extending between said rims, each stator vane having a pair of opposed coaxial end journals and said rims being respectively formed with holes in which said journals are turnable, said vanes being rotatable with respect to said rims between an open position where liquid can flow between said vanes and a closed position where said vanes engage each other, each vane having a pair of opposed end faces respectively situated adjacent but spaced slightly from said rims, and said rims being respectively formed with elongated grooves extending from one hole to the next of each rim and said grooves being respectively aligned with said end faces of said vanes when the latter are in their closed positions, a plurality of non-metallic sealing gaskets respectively situated in said grooves and extending along the entire length thereof, said gaskets extending outwardly beyond said grooves into engagement with said end faces of said vanes, when the latter are in their closed positions, said rims carrying at said grooves retaining means for retaining said gaskets in said grooves while freeing said gaskets for pressing against said end faces of said vanes to prevent liquid from passing between said rims and end faces of said vanes when the latter are in their closed positions, said rims respectively having at innermost parts of said grooves, innermost groove surfaces spaced from said gaskets, and a plurality of elongated sealing members narrower than said gaskets respectively situated between and in engagement with said innermost surfaces of said grooves and said gaskets and extending longitudinally along said gaskets along the entire length thereof for preventing liquid which reaches the space between said innermost surfaces of said grooves and said gaskets from leaking through the latter space beyond said sealing members wherein liquid under pressure seeks to flow from the high pressure side toward the other side of each groove when said vanes are in their closed positions, and said gaskets each being formed at said high pressure side of each groove with at least one through-passage providing for flow of liquid under pressure into the space between each gasket and said innermost surface of each groove into engagement with said sealing member for pressing each gasket on one side of said sealing member toward an end face of a vane.

2. The combination of claim 1 and wherein said retaining means includes opposed side surface portions of each groove respectively formed with shoulders directed toward said innermost surface of each groove, and each gasket having opposed flanges engaging said shoulders of said retaining means to be retained by said shoulders in said grooves.

3. The combination of claim 1 and wherein each gasket is of a substantially rectangular cross section while each sealing member is of a substantially circular cross section, and each gasket being formed at its surface which is directed toward and spaced from said innermost surface of each groove with a groove receiving part of a sealing member.

4. The combination of claim 1 and wherein said gaskets are made of a wear-resistant material.

5. The combination of claim 4 and wherein said gaskets are made of polyethylene.

6. The combination of claim 1 and wherein said sealing members are in the form of rubber cord.

* * * * *